(12) United States Patent
Opsvik (10) Patent No.: US 7,134,677 B2
(45) Date of Patent: Nov. 14, 2006

(54) FOLDABLE SCOOTER

(75) Inventor: Peter Opsvik, Oslo (NO)

(73) Assignee: Peter Opsvik AS, Oslo (NO)

( * ) Notice: Subject to any disclaimer, the term of this patent is extended or adjusted under 35 U.S.C. 154(b) by 0 days.

(21) Appl. No.: 10/535,631

(22) PCT Filed: Nov. 20, 2003

(86) PCT No.: PCT/NO03/00389

§ 371 (c)(1),
(2), (4) Date: Jul. 15, 2005

(87) PCT Pub. No.: WO2004/045943

PCT Pub. Date: Jun. 3, 2004

(65) Prior Publication Data

US 2005/0242537 A1   Nov. 3, 2005

(30) Foreign Application Priority Data

Nov. 21, 2002   (NO)   .................................. 20025584

(51) Int. Cl.
*B62M 1/00*   (2006.01)
(52) U.S. Cl. ................................. 280/87.041
(58) Field of Classification Search ........... 280/87.041, 280/87.01, 87.05, 87.021; 180/180, 181
See application file for complete search history.

(56) References Cited

U.S. PATENT DOCUMENTS

| | | | |
|---|---|---|---|
| 1,227,888 A * | 5/1917 | Converse ................ | 280/87.041 |
| 1,664,858 A * | 4/1928 | Headley ................. | 280/87.041 |
| 2,170,978 A * | 8/1939 | Smith ..................... | 280/87.05 |
| 3,434,558 A | 3/1969 | Allen ...................... | 180/26 |
| 5,848,660 A * | 12/1998 | McGreen ................ | 180/206 |
| 6,220,612 B1 | 4/2001 | Beleski, Jr. ............ | 280/87.041 |
| 6,315,307 B1 * | 11/2001 | Chen et al. ............. | 280/40 |
| 6,443,470 B1 * | 9/2002 | Ulrich et al. ........... | 280/87.041 |
| 6,460,866 B1 * | 10/2002 | Altschul et al. ....... | 280/30 |
| 6,588,787 B1 * | 7/2003 | Ou ......................... | 280/287 |
| 6,848,697 B1 * | 2/2005 | Lan ........................ | 280/87.05 |
| 2004/0262871 A1 * | 12/2004 | Schreuder et al. ..... | 280/87.1 |
| 2005/0242537 A1 * | 11/2005 | Opsvik ................... | 280/87.05 |

FOREIGN PATENT DOCUMENTS

| | | | |
|---|---|---|---|
| DE | 3537522 A1 | | 4/1987 |
| EP | 1213214 A2 | | 6/2002 |
| WO | WO 94/16928 | * | 8/1997 |
| WO | WO02/45539 | | 6/2002 |

* cited by examiner

*Primary Examiner*—J. Allen Shriver
(74) *Attorney, Agent, or Firm*—Schneck & Schneck; Thomas Schneck; David M. Schneck (57) ABSTRACT

A foldable scooter including a support device onto which a steerable front wheel is mounted and a rear carriage. The carriage is connected to the support device at the front of the carriage. The carriage is provided with at least one wheel at the rear. The carriage may be folded against the support device to form a compact unit which may be carried or wheeled. In an expanded position of the scooter, the front of the said carriage abuts a stop face connected to the support device. A rigid stay is connected to the carriage, which is pivotally connected at its first end to a mid-section of the carriage and is pivotally connected at its opposite end to the support device.

13 Claims, 7 Drawing Sheets

FOLDABLE SCOOTER

TECHNICAL FIELD

The present invention relates to vehicles and more specifically to scooters.

BACKGROUND

The scooters of prior art are generally not well adapted to situations where conventional use (propulsion by kicking) is not acceptable or impossible. In addition, scooters are not very well adapted to the need for transportation of goods which often accompanies personal transportation.

The traditional scooter must often be carried in situations where it can not be used, e.g. during travel by public transport. Even though many scooters have a compact design, such transport by carrying is impractical.

Several examples of collapsible, wheeled devices are known. One example of a collapsible, wheeled device is disclosed in U.S. Pat. No. 3,434,558. The device is collapsible in that a pair of wheels of the device can be pushed towards a third wheel guided by a stabilizing sway bar. The device is collapsed by use of both hands, and the design of the stabilizing sway and the platform makes it difficult to transport this vehicle in a collapsed situation.

EP 1213214A2 discloses a collapsible tricycle of which the framework mainly comprises tubes. Furthermore, the scooter is folded together with a folding mechanism disposed between the different tube members. The folding mechanisms are relatively complex constructions which comprise several small parts.

U.S. Pat. No. 6,220,612 also discloses a foldable tricycle. This tricycle is folded together by lowering the front part via a joint located at the connection between the rear and the front part of the cycle, leaving the tricycle in a collapsed position with all parts in substantially one plane with the front and the rear wheels at each end.

DE 3537522 A1 discloses a scooter in which the steering rod may be folded down onto the main structure of the device comprising a platform and wheels.

A foldable tricycle is also disclosed in DE 3138095 A1. This tricycle includes three wheels and may be folded together and transported on the wheels in a collapsed position. The described design requires that the platform is divided and can be folded. The folding of the tricycle is done using both hands. Further the tricycle is free to roll on the wheels in a folded position which is a disadvantage when the device is left unattended on a sidewalk or the like.

One feature missing in these prior devices is a scooter including three wheels which can be folded using one hand only.

A second useful feature would be a scooter which can be carried or wheeled in a folded position like a wheeled suitcase. Compartment units may be attached to the handlebar construction as to make the scooter work like a wheeled suitcase.

A third useful feature would be a scooter which may be left unattended without the risk of the folded scooter moving unintentionally.

A fourth useful feature would be to provide a scooter which has a rigid platform construction.

A fifth useful feature would be to provide a scooter which accommodates motorized propulsion.

SUMMARY OF THE INVENTION

The embodiments of the invention include a scooter including a support device holding a steerable front wheel. A rear carriage is connected to the support device at the front of the carriage. This rear carriage is provided with at least one wheel at the rear. The rear carriage may be folded against the support device forming a compact unit which may be carried or rolled. In a utilizing position, the front of said carriage rests against a stop face connected to the support device. A rigid stay is pivotally connected at its first end to a mid-section of the carriage and is pivotally connected at its second end to the support device. When the scooter is collapsed, the carriage will pivot around the first end of the stay, and the rear wheel or wheels is swung towards the front wheel. Further advantageous embodiments of the invention will be disclosed below.

The invention relates to a technical solution where a vehicle for personal transport (corresponding to a traditional scooter) may be transformed into a compact and trolley-like compartment unit (corresponding to a traditional suitcase with wheels) which may be handled and is acceptable outside the intended field of application for a scooter.

In one embodiment disclosed in the present application, the vehicle comprises three wheels, which makes it possible for a rider to have a stable ride at low velocity. Corresponding two-wheeled scooters will be more unstable at low velocity.

The invention may function as a hybrid, hence, as a compartment unit (briefcase, suitcase, shopping bag, etc.) and/or a means of transportation in one compact and manageable unit, which will be just as acceptable to bring indoors as a wheeled briefcase.

BRIEF DESCRIPTION OF THE DRAWINGS

FIG. 10 shows a perspective view of a user and the scooter in a folded position, utilized as a wheeled briefcase or the like.

DETAILED DESCRIPTION OF THE INVENTION

Figures 1, 2:
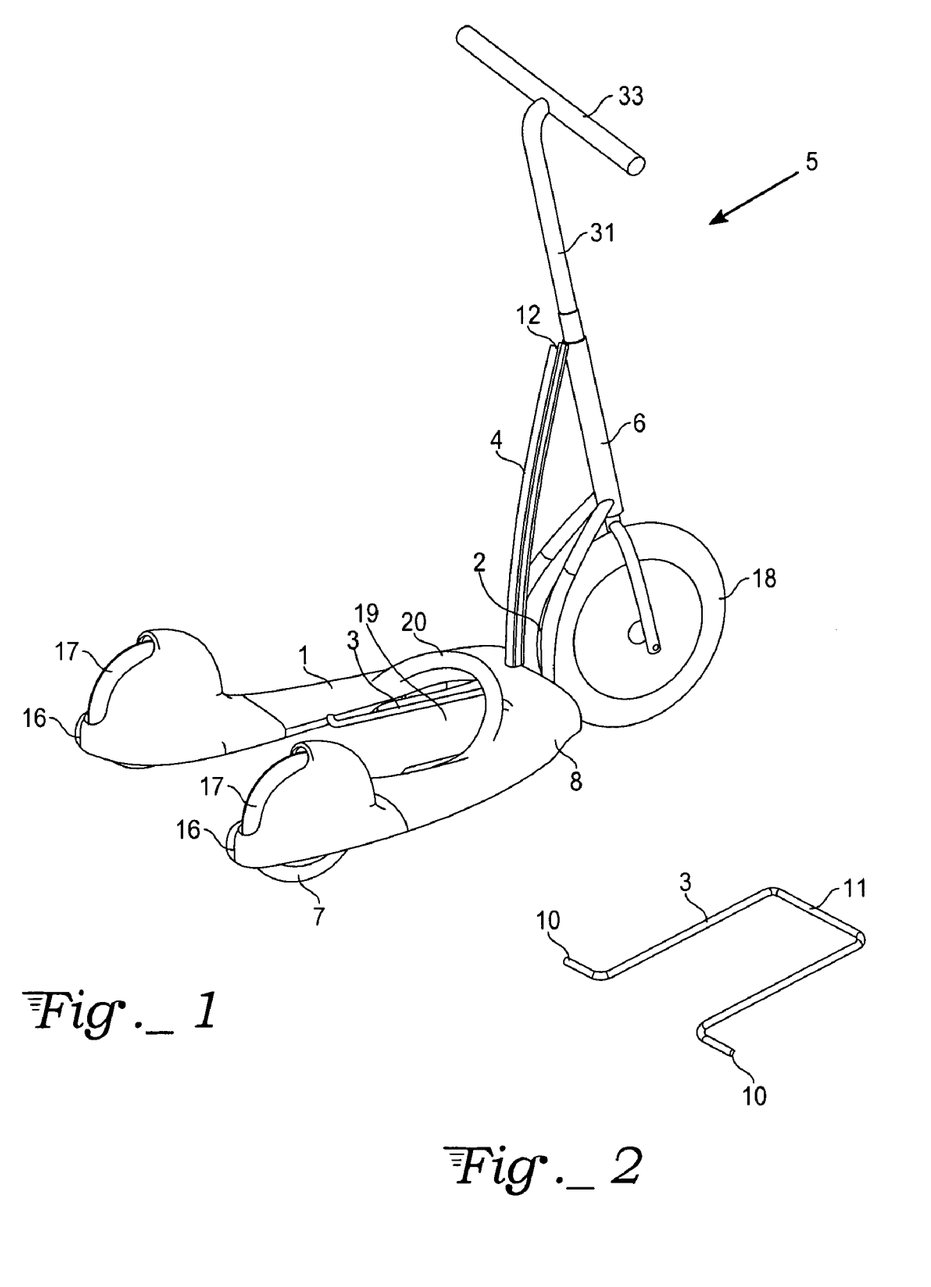
FIG. 1 is a perspective view of a scooter embodiment of the invention.
FIG. 2 is a perspective view of a rigid stay as seen in FIG. 1.

As shown in FIG. 1, the illustrated embodiment shows a scooter 5, comprising a rear carriage 1, comprising at least one platform and two rear wheels 7 moveably arranged to front struts 2 via a rigid connection 3. Front struts 2 are attached to a support section 6 through which a steering bar 31 affixed to a steering handle 33 passes. At the end of bar 31, steerable front wheel 18 is mounted on an axle at the end of bar 31. Support section 6 is attached to a guide structure 4 to facilitate folding of the device. The front 8 of rear carriage 1 is slidably mounted on guide 4 as will be described in relation to FIG. 6A, 6B, below. The front wheel 18 might be turned through an angle of at least 180° and is fixed in a position in line or transverse to the rolling direction when the device is folded. The rear carriage 1 is further provided with a handle 20 near the front of the platform, which enables folding of the device by use of one hand.

The rear carriage 1 is designed generally as a U with two wheels 7 arranged at the rear ends of this U structure's arms.

Figure 5:
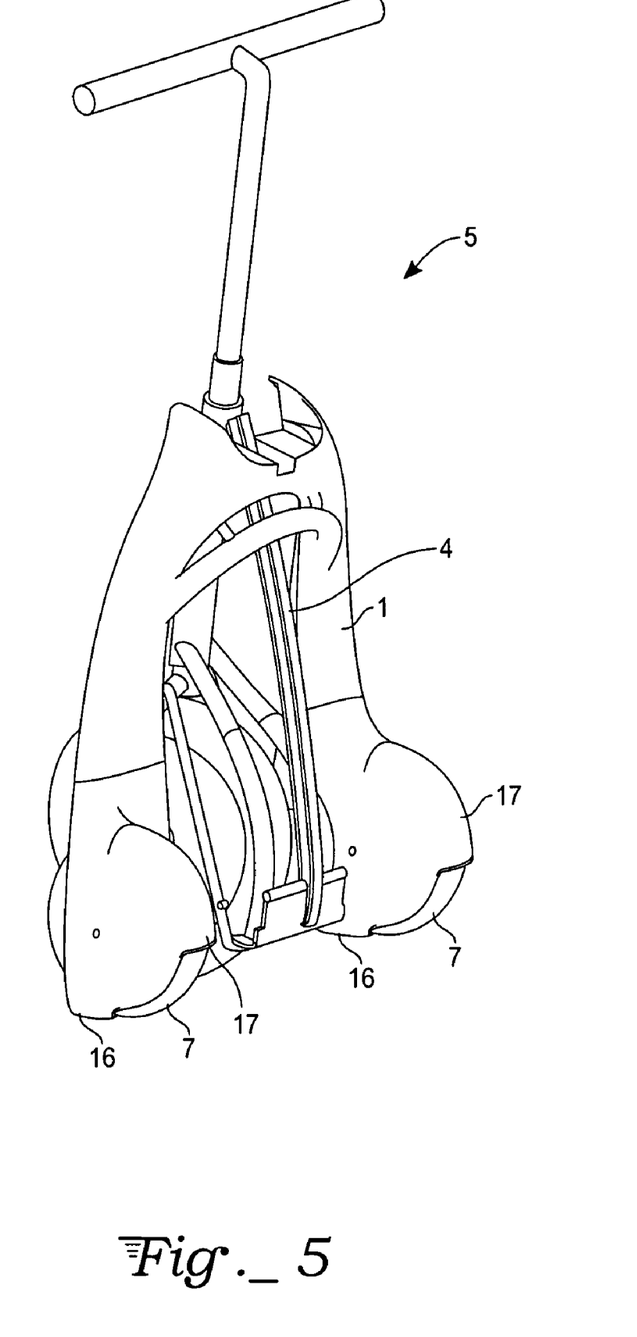
FIG. 5 is a perspective view of a scooter embodiment fuly collapsed.

As seen in FIG. 5, the rear portions 16 of the carriage 1 behind the rear wheels 7 is designed to support the scooter 5 in folded and upright position. These rear portions may act as platforms on which the device rests if tipped upright. In this position the scooter will not roll away. If the folded scooter is tilted backwards, the rear wheels 7 will be brought in contact with the ground at holes 17 and it can be wheeled as a wheeled briefcase or the like. Due to the scooter being tilted around a fixed point 16 on the rear carriage 1, this may be done by the use of one hand by applying a minimum moment of force.

Figure 4:
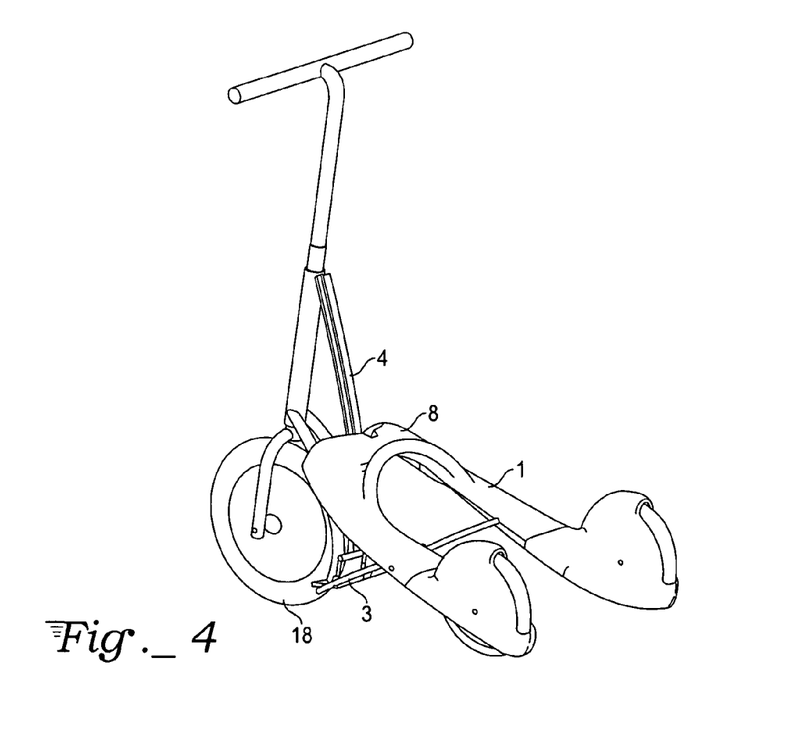
FIG. 4 is a perspective view of a scooter embodiment being folded.

The rear carriage 1 is connected to the front part of the tricycle via a rigid connection (stay) 3, which in the embodiment disclosed and shown in FIG. 2 comprises a metal rod bent in the shape of an U with a straight stay 11 and an outward bent section 10 at each of the free ends of the U. The rigid connection 3 is pivotally arranged to a mid-section of the carriage 1 and to the lower part of the forward part 1, so that the carriage 1 can be folded towards the struts 2 when the forward portion of the rear carriage is lifted. As seen in FIG. 4 rigid connection 3 pivots at section 10 on carriage 1 while straight stay remains at a fixed translational position on the frame supporting the front wheel 18. Front 8 of carriage 1 moves along guide structure 4.

Figures 6A, 6B:
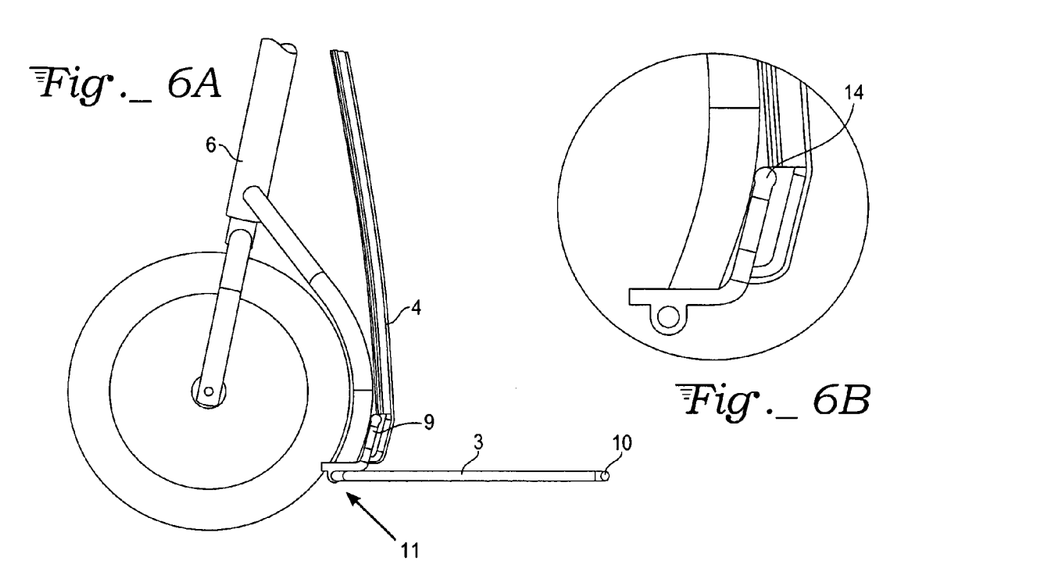
FIG. 6A shows a side view of the front wheel section of the scooter in closer detail.
FIG. 6B is an enlarged detail of the connections of the rigid stay of FIG. 6A.
Figure 7A:
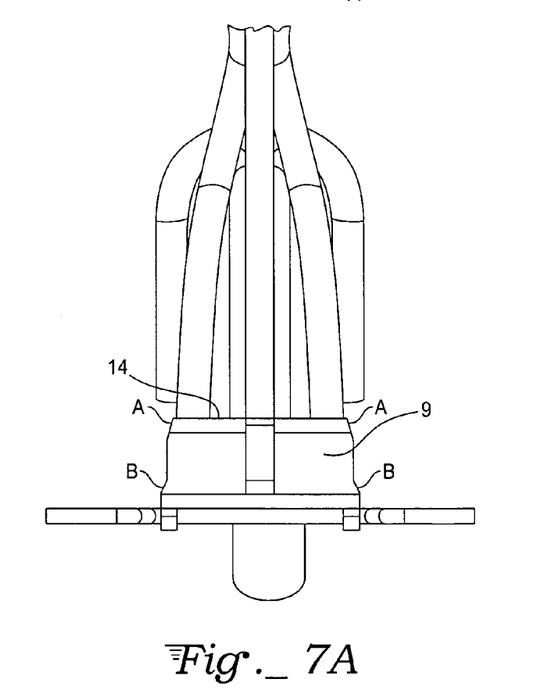
FIG. 7A shows a rear view of the front part of the scooter of FIG. 1.
Figure 7B:
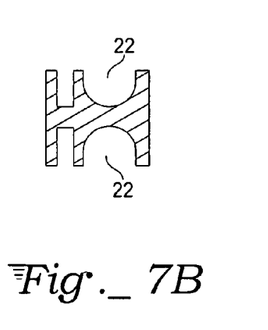
FIG. 7B shows a cross-section of the guide structure of FIG. 6B.
Figure 8:
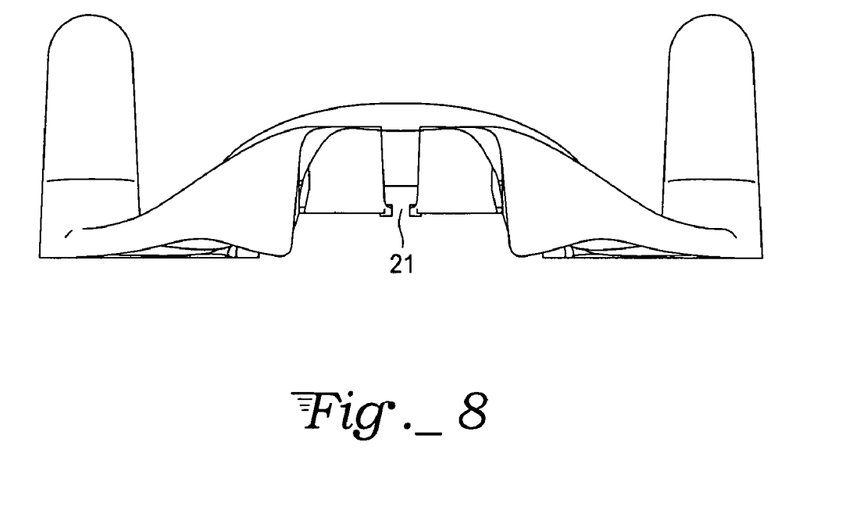
FIG. 8 shows a front view of the rear carriage.
Figure 9:
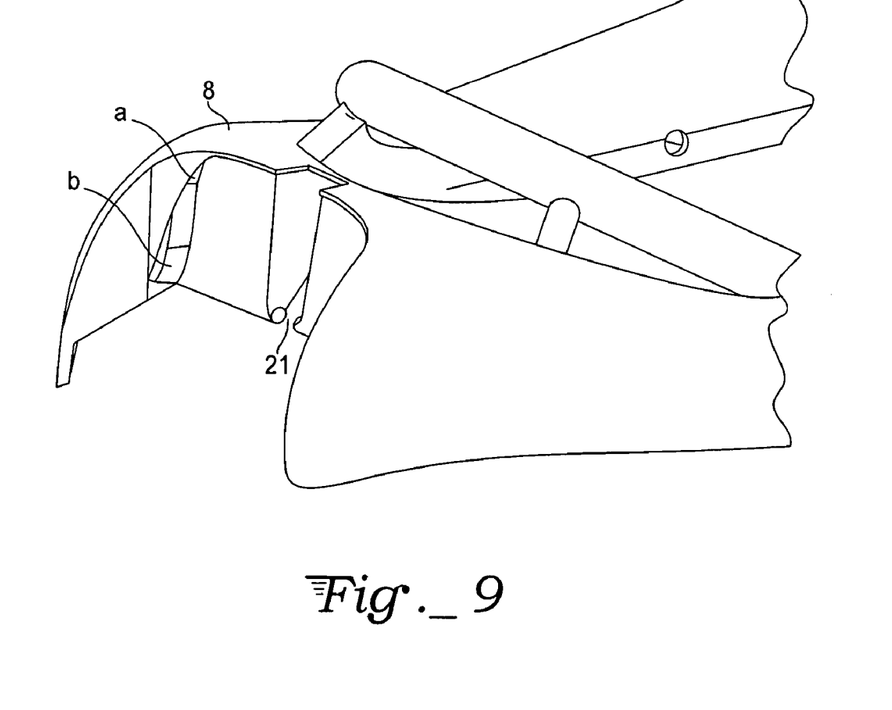
FIG. 9 is a perspective view of the front part of the rear carriage.

Further, the rear carriage 1 is slidingly arranged in a guide 4, on the front part of the scooter, as shown in FIG. 6A, 6B. Two pegs 21 (see FIG. 8, 9) protruding towards each other engage slots 22 (shown in FIG. 7b) in guide 4. Generally, the guide 4 runs from the stop face 9 to a position located higher on the support device 6 and serves to guide carriage 1 in respect to the support device 6 when the scooter is collapsed or expanded.

The angle between the support device of the scooter and the ground is sharp to provide an enhanced stability during steering and when the front wheel is in a transverse position.

In the personal transport position, the front part of the carriage 1 abuts a stop face 9. The stop face 9 shown in FIGS. 6A and 7A comprises an upper edge 14 and sloping edges A and B; the front part 8 of the carriage 1 is resting by abutment of corresponding facing sloping edges A and B on the stop face 9. The sloping edges A and B on the stop face 9 are designed at angles to avoid frictional jamming.

Figure 3:
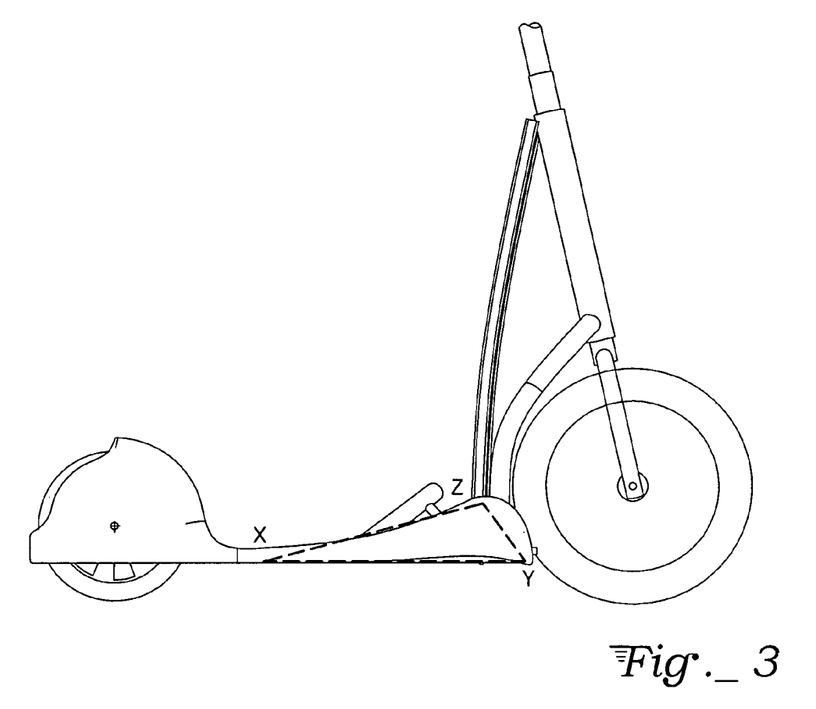
FIG. 3 is a side view of the scooter in a position for personal transportation with the forces acting on the structure indicated.

The contact points A-a and B-b (of surfaces shown in FIG. 7A with surfaces shown in FIG. 9) form a quadrangle which carries moment of force between the parts in the transversal plane. The open U-shaped area of the front portion 8 of the carriage 1 is guided over a transversal edge area 14 formed at the upper part of the stop face 9 of the front portion. To ensure that the forces are transferred via the sloping edges A-a and B-b, the carriage 1 abuts the stop face 9 with a close fit in the horizontal direction and with a slight clearance vertically from the upper edge area 14. The upper edge area 14 is substantially carrying forces in the horizontal direction which are caused by opposite directed tensile forces in the rigid connection 3. FIG. 3 shows the forces in a triangle formed by the locating points x, y, z.

Figure 10:
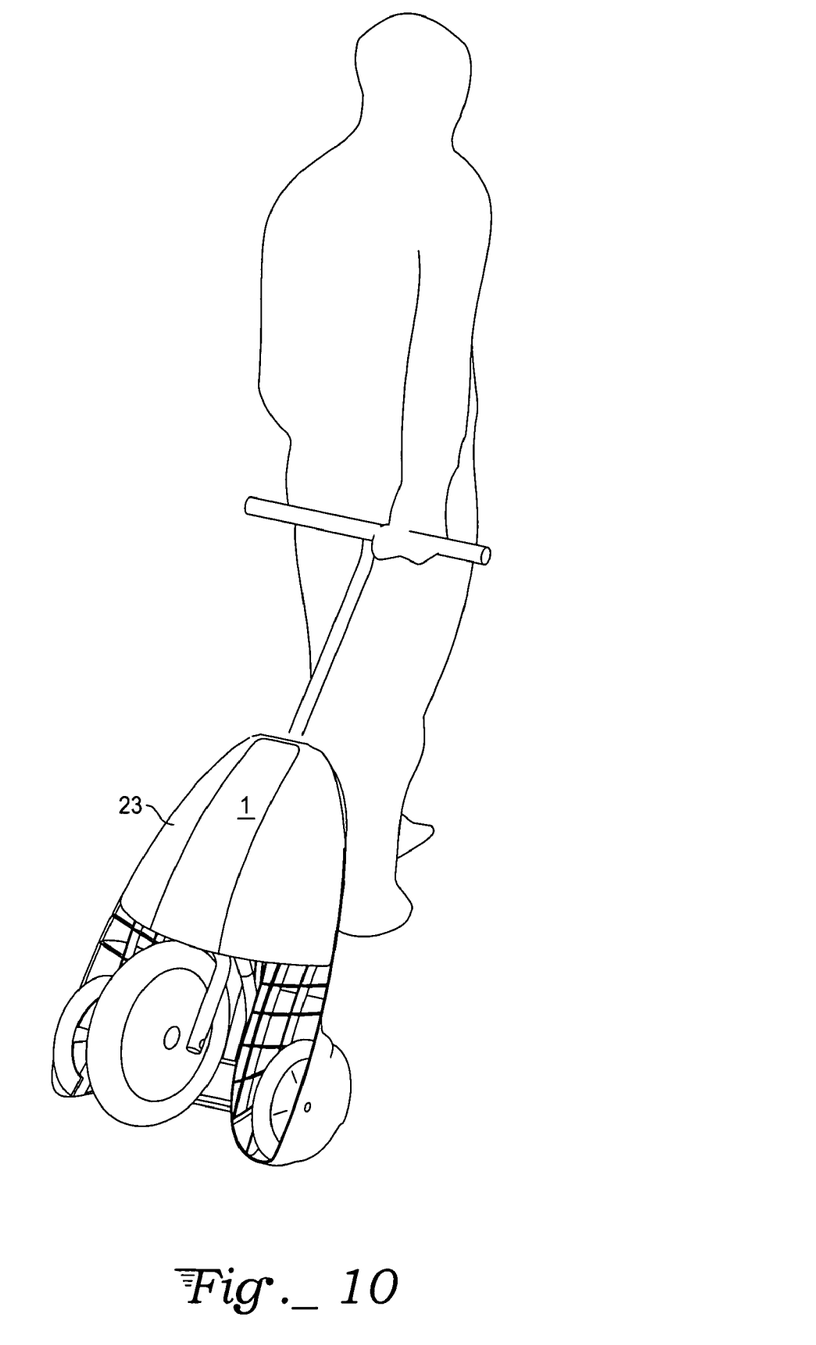
Figure 11:
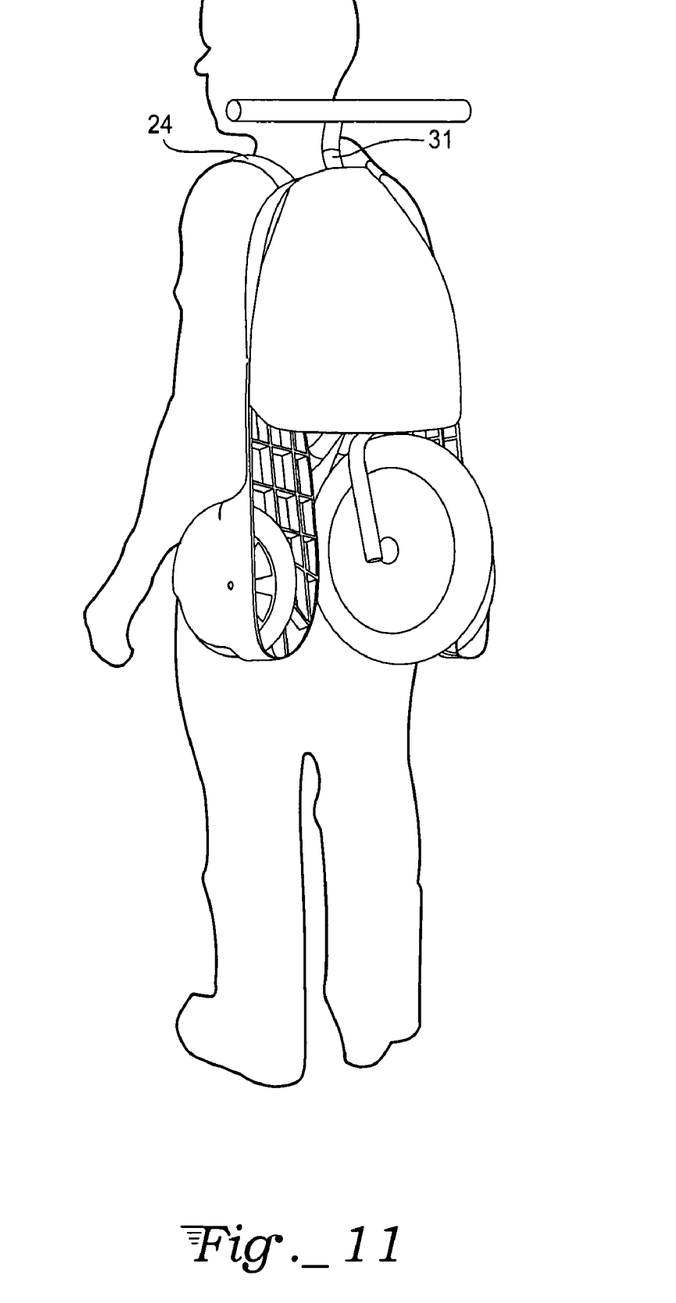
FIG. 11 shows a perspective view of a user and the scooter carried as a backpack.

With reference to FIG. 10, the support device 1 may comprise compartment units 23, so that the scooter forms a wheeled briefcase or the like in a collapsed position. Further with reference to FIG. 11, the tricycle may be equipped with carrying strap 24 to carry it like a backpack or a bag. When collapsed front wheel 18 fits between rear wheels 7, bar 31 retracts into support device 6 (shown in FIG. 1).

The main parts of the vehicle are made of metal, plastic or other substantially rigid materials. As was illustrated in FIG. 1, the front wheel of the scooter is joined to a front wheel mount assembly. This assembly in the illustrated embodiment includes the support section 6, the steering bar 31 and steering handle 33, a guide 4, and a stop face 9. A front wheel mount will contain at least some of these elements. The front wheel mount assembly is joined to a carriage by a pivot stay which is attached to the carriage, for example to the midsection of the carriage such that the stay can pivot. For example, ends of the stay (the rigid connection 3) may be inserted into holes on the carriage such that the stay ends pivot when the carriage is raised. A second end of the stay (i.e. the rigid connection 3) is attached to the front wheel mount assembly such that it too may pivot. The carriage is mounted such that it may fold in such a way that the rear wheels on the carriage are brought toward the front wheel, and the carriage pivots on the stay. When fully folded, the two rear wheels are at least partially between the front wheel, as shown in FIG. 5. The guide is a secondary structure for use in folding. Pins on the carriage fit into the guide, such that the carriage may be more easily folded against the front wheel mounted structure.

As shown in FIG. 1, the rear wheels are joined to the carriage such that the axles of these wheels are above the surface of the carriage riding platform. This adds to the stability of the device by allowing a riding platform that is lower to the ground. The section of the carriage surrounding the rear wheels exposes an area of the bottom of the wheel, for use in normal operation, and a section towards the top, for use in rolling the device when the carriage is folded against the wheel mount assembly. In addition, a section of the back of the wheel is enclosed to provide a surface onto which the device may rest when tipped upright. This feature makes the device stable when positioned as in FIG. 5.

The invention claimed is:

1. A scooter comprising:
   a front wheel;
   a front wheel mount assembly onto which the front wheel is rotatably mounted;
   a carriage joined to the front wheel mount;
   at least one rear wheel rotatably mounted on said carriage;
   a substantially U-shaped dual pivot single piece stay having first ends pivotally mounted on said carriage and a second end pivotally mounted on said front wheel mount assembly, wherein said carriage is attached to said front wheel mount such that it can fold against the mount, thereby bringing the front wheel closer to the at least one rear wheel.

2. The scooter of claim 1 further including:

a guide mounted on said front wheel mount assembly; and a guide runner mounted on a carriage front end and engaged into said guide such that when said carriage is folded against the front wheel mount assembly, the guide runner moves in the guide, thereby conforming a position of the carriage front end to a defined track.

3. The scooter of claim 1, wherein said at least one rear wheel includes two rear wheels.

4. The scooter of claim 3, wherein said two rear wheels are mounted on said carriage such that said carriage encloses sections of said wheel such that said wheel has an enclosed rear section that may function as a ground rest when the device is tipped up, and an unenclosed section between said enclosed rear section and a top surface of said carriage, wherein said unenclosed wheel section exposes said rear wheels such that said exposed rear wheels may be rolled over a surface when said carriage is angled.

5. The scooter of claim 1, further including straps attached on said carriage such that said device may be worn as a backpack.

6. The scooter of claim 1, further including a handle molded into the carriage, wherein pulling up on the handle folds the carriage against the mount.

7. The scooter of claim 3, wherein said two rear wheels have axels above a platform of said carriage.

8. The scooter of claim 1, wherein said carriage includes an internal storage area.

9. The scooter of claim 1, wherein said carriage is U shaped.

10. The scooter of claim 1, wherein said carriage may fold against the mount such that said front wheel is at least partially between said two rear wheels.

11. A scooter comprising:

a front wheel;

a front wheel mount assembly onto which the front wheel is rotatably mounted, said mount assembly having a stop face at a base of said mount assembly;

a carriage joined to the front wheel mount assembly such that it abuts said stop face when the scooter is folded out;

at least one rear wheel rotatably mounted on said carriage;

a substantially U-shaped pivot stay having first ends pivotally mounted on said carriage and a second end pivotally mounted on said front wheel mount assembly, wherein said carriage is attached to said front wheel mount such that it can fold against the mount, thereby bringing the front wheel closer to the at least one rear wheel.

12. The scooter of claim 11 further including:

a guide mounted as part of said front wheel mount assembly; and a guide runner mounted on a carriage front end and engaged into said guide such that when said carriage is folded against the front wheel mount assembly, the guide runner moves in the guide, thereby conforming a position of the carriage front end to a defined track.

13. The scooter of claim 11, wherein a first shape of said stop face conforms to a second shape of an abutting end of said carriage such that frictional jamming is reduced.

* * * * *